April 19, 1960     A. BOSCO     2,932,909
EDUCATIONAL ROTARY CHART
Filed Aug. 10, 1959
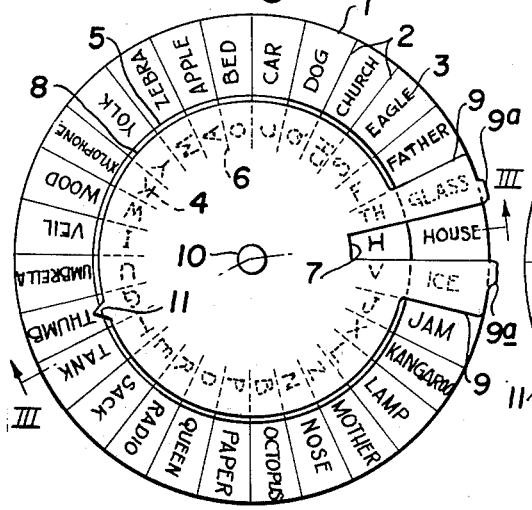
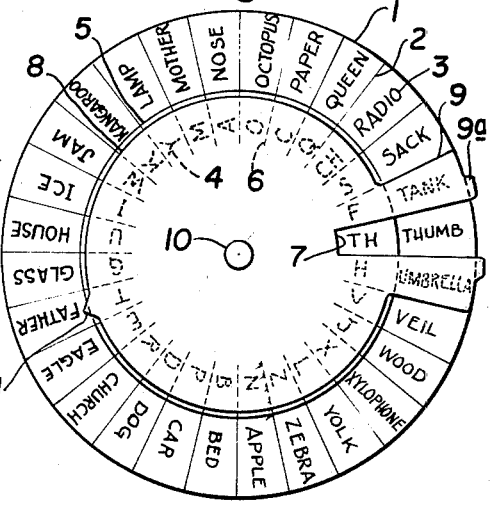
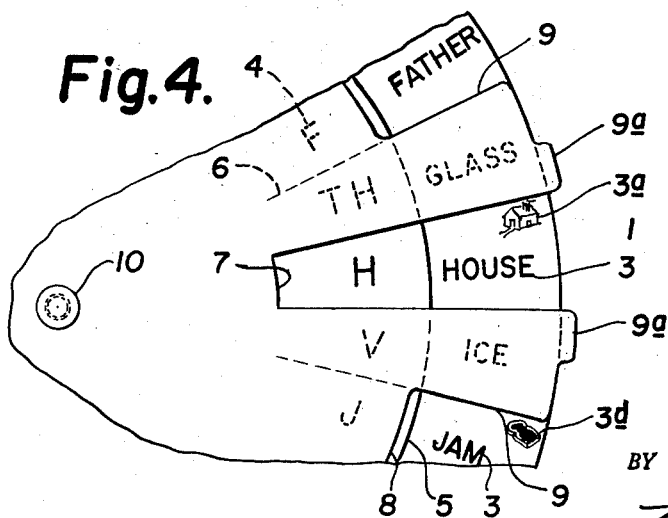
INVENTOR.
ALFREDO BOSCO
BY
*William J. Ruano*
ATTORNEY

United States Patent Office 2,932,909
Patented Apr. 19, 1960

2,932,909

EDUCATIONAL ROTARY CHART

Alfredo Bosco, S'Arsenio, Salerno, Italy, assignor to John D'Amato, Pittsburgh, Pa.

Application August 10, 1959, Serial No. 832,835

2 Claims. (Cl. 35—74)

This invention relates to an educational device and, more particularly, to a rotary chart for educating the student as to the spelling and meaning of words.

Charts of various types have been used in the past to facilitate learning of the spelling and meaning of words. However, one outstanding disadvantage of conventional charts is that they do not provide a predetermined sequence, that is, they do not require the student to study words in any predetermined sequence or succession so that no words will be missed and so that words will be taken up in the particular order or progression desired by the chart formulator for a particular lesson.

An object of the present invention is to provide a novel educational chart which is devoid of the above named disadvantages and which will facilitate learning of the spelling as well as the meaning of words and which will require a study of words in a predetermined sequence.

A more specific object of the present invention is to provide a novel educational rotary chart in which the first letter or the first two letters of a word are associated, by the student, with the word itself, and wherein when each association is made, that is, when the first letter is matched to the word, an index will point to the next word to be studied or to be associated, thereby fixing a predetermined sequence of words for matching with first letters, thus assuring the coverage of all words in the desired progression selected by the chart maker.

Other objects and advantages of the present invention will become more apparent from a study of the following description taken with the accompanying drawing wherein:

Fig. 1 is a plan or top view of an educational, word building, rotary chart embodying the principles of my invention and wherein the letter "H" and word "House" are associated;

Fig. 2 is a chart such as shown in Fig. 1 but showing the position of the various relatively rotatable portions of the chart when the top portion thereof is rotated to the next segment indicating as the first letter or group of letters "TH" and after which the word "Thumb" has been associated therewith;

Fig. 3 is an enlarged, cross-sectional view taken along line III—III of Fig. 1; and Fig. 4 is an enlarged, fragmentary view of a portion of the chart shown in Fig. 1.

Referring more particularly to the drawing, numeral 1 denotes a base disc having inscribed, along its periphery, a plurality of radially extending segments, each of which has a word written therein. Although not necessary it is very desirable to associate the word with a picture of the object designated by the word so that the meaning of the word will become fixed in the mind of the student. For example, the word "House," shown by numeral 3, is associated with the picture of the house 3a, as illustrated in Fig. 4, and the word "Jam" is associated with the picture of jam 3d. Radially extending lines 2 define the various segments base on disc 1 and the periphery of a second disc 5 denotes the end of the segment.

Pivotally mounted on the base disc or chart 1 by means of a rivet, stud or other pivotal element 10 is the second disc 5 which has a plurality of corresponding segments along the circumference thereof which bear the first letter (or first two letters) of a word, for example, the letter "F" indicated by numeral 4 as being the first word of "Father" or the letter "H" as being the first letter of the word "House." Numeral 6 denotes the radial dividing lines between the various segments on disc 5. A third disc or cover element 8 is provided which has a window portion 7 cut-out in the form of an arcuate segment for exposing both the first letter, on disc 5, and the word on disc 1, as shown more clearly in Figs. 1 and 4 wherein the first letter "H" is shown as being associated with the word "House" on the base disc 1. The cover disc 8 is also provided with an index, such as, for example, a radially projecting pointer 11 for denoting the next word to be studied or whose first letter is to be moved into association with the word itself. In Fig. 1, such next word is "Thumb." It will be noted that the index or pointer 11 is disposed less than 180° from the word "House" in a clockwise direction, more specifically, it is one arcuate segment less than diametrically opposite the word "House." Tabs 9a may be formed on the periphery of disc 8 if desired.

An important feature of the present invention is the arrangement of words, their first letters and index for providing a predetermined sequence of words to be studied and matched with their first letters so that the student will be required to follow a predetermined succession of words, such as chosen by the chart maker, to provide the progressive word study desired, as well as to assure that the student will not miss any word on the chart.

In operation, for example, let us assume that the first word to be studied is "House." In this instance, disc 5 is rotated relative to the base disc 1 until the letter "H" on disc 5 matches the word "House," as shown in Fig. 1. Now the pointer 11 points to the word "Thumb" as being the next word to be studied. The student then moves the top disc 8 counter-clockwise from the position shown in Fig. 1 to that shown in Fig. 2 so as to expose the first two letters "TH" of this word. In short, after each word is associated with its first letter (or groups of letters) the pointer will point to the next word to be studied and the first letter or letters thereof will always be in the next segment of disc 5 in a counter-clockwise direction. Of course, now "TH" is matched with the wrong word namely "Glass," as shown in Fig. 1, therefore, the student must rotate the disc 1 relative to disc 5 until "TH" matches or is in radial alignment with the word "Thumb," as shown in Fig. 2. After the word "Thumb" has been matched with its first two letters, the indicator 11 points to the next word to be studied, namely, "Father." It will be noted that the letter "F" is immediately adjacent or above the letters "TH." In other words, each first letter (or letters) is taken up in succession in a counter-clockwise direction pattern on chart 5 as being the first letter of the next word to be studied. In each instance, the pointer will indicate what the next word is to be studied, even before the first letter or first two letters are exposed. In his manner, all the various words on the disc 1 will be studied and the student will be required to match the first letter (or first two letters or perhaps even the first syllable) with the entire word and thus become familiar with the word and its spelling. In some instances, it may be desirable to have the first letter on disc 5 shown in capital form and the first letter thereof on disc 1 in lower case form so that the student will become familiar with both forms of the first letter. If desired, there may be a cut-out portion on the entire or portion of the periphery of disc 5 to expose all or most of the first letters thereon to facilitate location thereof while the operator is endeavoring to match the first letter or letters to the entire word. Of course, other even numbers of words may be used instead but the general principle of operation will be the same.

Thus it will be seen that I have provided an efficient and educational word learning, rotary chart that will compel the student to study a predetermined sequence of words and to associate the first letter or letters with the word itself, and so that no words will be missed by the student, the matching operations of the chart being challenging and extremely interesting and enjoyable by the student.

While I have illustrated and described a single embodiment of my invention, it will be understood that this is by way of illustration only, and that various changes and modifications may be made within the contemplation of my invention and within the scope of the following claims.

I claim:

1. An educational word building chart, comprising a disc having a plurality of words written in radially extending segments thereof disposed along the periphery, a second disc rotatable with respect thereto about the same central axis and having corresponding radially extending segments disposed along the periphery thereof, each having the first letter of a word on the first mentioned disc, and a third disc having a window cut-out therefrom sufficiently to expose the first letter of said second disc and a word on the first disc and having a pointer for denoting the next word to be studied, the total number of words and first letters being the same and an even number, and arranged so that when the first letter on the second disc is matched with the word beginning with that letter on the first disc, the pointer will point to the next word to be studied and the first letter of such last mentioned word will be in the next segment of said second disc.

2. A chart as recited in claim 1 wherein said pointer is located one segment next to that diametrically opposite said window.

References Cited in the file of this patent

UNITED STATES PATENTS

| | | |
|---|---|---|
| 1,578,665 | Kantor | Mar. 30, 1926 |
| 1,676,410 | Paul | July 10, 1928 |

FOREIGN PATENTS

| | | |
|---|---|---|
| 312,708 | Germany | June 4, 1919 |